(12) United States Patent
Delasse (10) Patent No.: US 7,290,817 B1
(45) Date of Patent: Nov. 6, 2007

(54) METHOD OF CONDUCTING AN ELECTRONIC REPAIR BUSINESS EMPLOYING A MOBILE LABORATORY

(76) Inventor: Michael Delasse, 216 N. Main, Sand Springs, OK (US) 74063

( * ) Notice: Subject to any disclaimer, the term of this patent is extended or adjusted under 35 U.S.C. 154(b) by 0 days.

(21) Appl. No.: 11/519,181

(22) Filed: Sep. 11, 2006

(51) Int. Cl.
*B60J 7/00* (2006.01)

(52) U.S. Cl. .............................. 296/24.32; 296/24.43; 296/24.44

(58) Field of Classification Search ............. 296/24.44, 296/24.43, 24.32
See application file for complete search history.

(56) References Cited

U.S. PATENT DOCUMENTS

4,643,476 A 2/1987 Montgerard
5,137,321 A 8/1992 Landry et al.
6,612,008 B1 9/2003 Thoma

*Primary Examiner*—Joseph D. Pape
(74) *Attorney, Agent, or Firm*—William S. Dorman (57) ABSTRACT

A method of conducting an electronic repair business employing a mobile laboratory comprising converting a preexisting mobile vehicle of the van type into a mobile electronic laboratory and repair shop by first stripping all of the preexisting components in the van rearward of the existing front seats to provide a relatively flat floor from the front seats to the rear doors of the vehicle, the resulting floor being 10 to 12 feet wide, 16 to 18 feet in longitudinal direction and having a work space approximately 6 feet above the resulting floor, providing a transverse bulkhead arranged vertically behind the front seats, so that the space behind the bulkhead constitutes a work space, and fitting the work space into an electronics diagnostic and repair laboratory by adding the necessary work components and electronic components.

3 Claims, 9 Drawing Sheets

METHOD OF CONDUCTING AN ELECTRONIC REPAIR BUSINESS EMPLOYING A MOBILE LABORATORY

BACKGROUND OF THE INVENTION

1. Field of the Invention

The present invention relates generally to methods of conducting repair business in a mobile laboratory and specifically to the vehicle employed in the business and its method of use during operation for the electronic repair business. Repair, in the broad sense includes upgrades and innovative solutions to electronic problems.

2. Prior Art

For the purpose of providing methods of conducting electronic repair business and vehicles for use in connection therewith, a number of various designs have been broadly proposed in the related art:

U.S. Pat. No. 5,137,321, issued on Aug. 11, 1992, to Landry et al., for a mobile office van conversion, while not relating specifically to a method of conducting a repair business, nevertheless, discloses a method of employing a van for a mobile office conversion. In Landry, the cargo space behind the front seats is converted into a mobile office.

Montgerard U.S. Pat. No. 4,643,476, issuing on Feb. 17, 1987, discloses a mobile band instrument repair shop. In Montgerard, a mobile trailer is converted into a repair shop for repairing band instruments.

One of the interesting features of the Montgerard patent is that it provides a somewhat detailed description of the prior art itself in Column 1, Lines 17 through 36 as follows:

"Several of the related art devices include a motorized general purpose traveling workshop for use during war described in the U.S. Pat. No. 2,365,940, issued to Couse on Dec. 26, 1944; a woodworking shop mounted in a trailer described in the U.S. Pat. No. 4,055,206, issued to Griffin on Oct. 25, 1977; a motorized self-contained van for servicing automobiles in remote regions described in the U.S. Pat. No. 4,230,358, issued to Legueu on Oct. 28, 1980; a van including a power source having vehicle testing equipment for testing the electrical performance of a motor described in the U.S. Pat. No. 3,697,123, issued to Gygrynuk on Oct. 10, 1972; a mobile muffler shop mounted on a truck and including tubing bending equipment described in the U.S. Pat. No. 3,844,158, issued to Mercer on Oct. 29, 1974; a self-contained kitchen unit for placement in a van type vehicle described in U.S. Pat. No. 3,888,539, issued to Niessner on Jun. 10, 1975; and a mobile voting service located in a motorized vehicle described in the U.S. Pat. No. 4,377,367, issued to Smith on Mar. 22, 1983."

Another prior art patent of interest is Thoma U.S. Pat. No. 6,612,008 B1, issuing on Sep. 2, 2003. Thoma is of interest in that the patent itself is couched in terms of a method for conducting a repair business using a mobile vehicle.

SUMMARY OF THE INVENTION

The present invention involves a van conversion using a full-sized van. Purely for purposes of example the van shown in the drawings is a Dodge Sprinter having a length of 18 to 22 feet and an internal height from the deck in rear to the inside of the roof of the vehicle of approximately 6 feet with a cargo width of approximately 10 to 12 feet. The reason for specifying a full van, as opposed to a mini-van, is that the nature of the computer repair business requires considerable space for making the repairs, analyzing the problems and for carrying a minimum of parts necessary to effectuate a practical repair business.

For the purpose of converting the van into a proper vehicle for conducting the method of repair business described herein, the rear of the van behind the front seats is stripped of seating and the preexisting van equipment, and a vertical transverse bulkhead is installed immediately behind the front seats. This part of the conversion results in a space of approximately 12 to 16 feet in longitudinal length, 10 to 12 feet in width and 6 feet in height. A longitudinal track is installed in the flooring of the vehicle extending from the rear doors thereof to the bulkhead behind the front seats. A plurality of slidable seats are mounted for slidable positioning along the length of the track. A table or workbench is provided along one side of the van for supporting thereon monitors, keyboards and electronic mice and other electronic diagnostic elements and devices for the purpose of analyzing and working on problems in connection with any electronic equipment brought in by customers to be repaired by the overall service provider. The slidable seats are therefore positional along the bench/table in conjunction with the monitors, keyboards, etc. The sides of the vehicle which are not otherwise employed for the monitors are used as shelf space for electronic components that are used in the business of repair of computers etc. Along the sides of the top of the vehicle are bins for storing parts and equipment in a manner similar to the storage of articles in aircraft. That is, the bins are provided with closures for preventing the articles stored therein from falling out during transport of the van from one location to another.

DETAILED DESCRIPTION OF THE PREFERRED EMBODIMENTS

Figure 1:
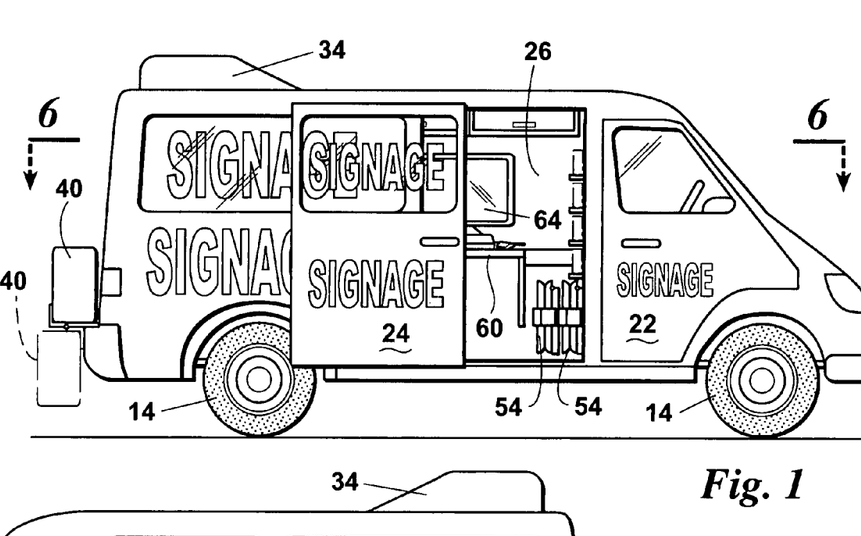
FIG. 1 is a elevation view of the starboard side of the vehicle which is used in the invention.

Referring to the drawings in detail, FIGS. 1 through 7 show a van 10 of suitable size to store the necessary components for the van to carry with it for the various tasks and assignments it must cover. The van 10 has a conventional roof 12, tires (four) 14, a port (outer) side 16, and a starboard (outer) side 18. The vehicle 10 is provided with conventional port and starboard front doors 20 and 22 respectively, and a starboard sliding door 24 which, in the FIG. 1 showing, is slid to a rear position leaving an opening 26 on the starboard side of the vehicle to permit a person to enter the vehicle from the outside.

The vehicle is also provided with a conventional motor (not shown), conventional drive system (not shown), a driver's seat 30 and a passenger seat 32. For the sake of providing maximum interior space in the vehicle 10 an air conditioner 34 is mounted on the roof of the van near the rear of the vehicle.

Figure 2:
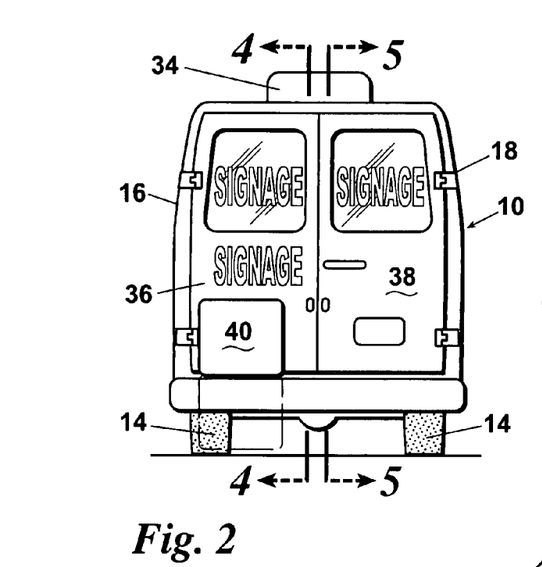
FIG. 2 is a side view of the vehicle shown in FIG. 1.
Figure 3:
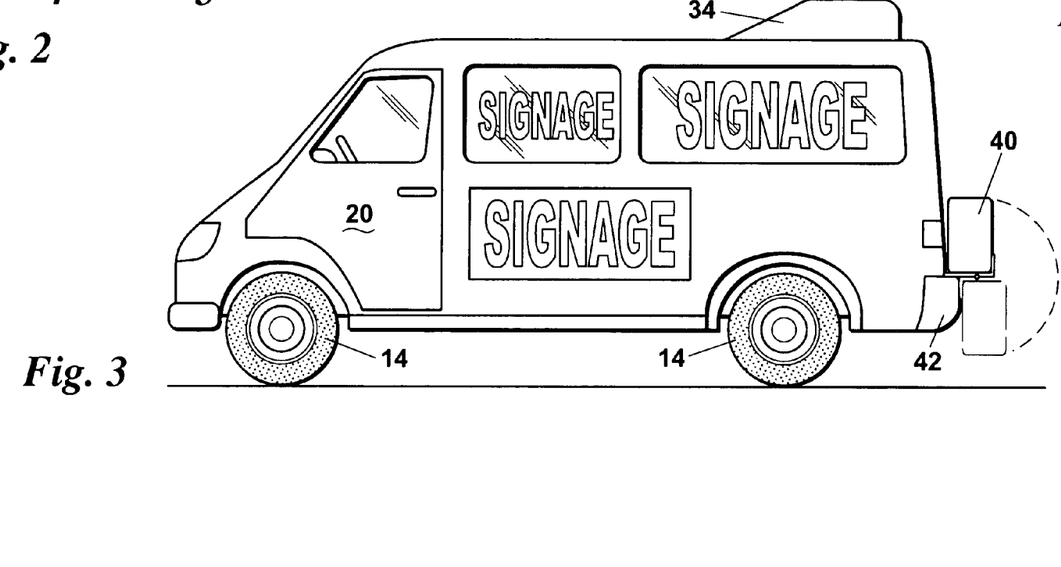
FIG. 3 is an opposite side view of the vehicle shown in FIG. 2.

The rear of the vehicle is provided with left and right hand doors 36 and 38 which fold together in a conventional manner as shown in FIG. 2. An auxiliary generator 40 is mounted on the rear bumper 42 but is foldable downwardly, as best shown in FIG. 3, to permit the rear doors to be opened. The forward interior area of the vehicle in which the driver's and passenger's seats 30 and 32 are located can be referred to as the cab or cab area 44 whereas, the rear interior portion of the vehicle behind the cab can be referred to as the cargo area 46 (which is also the work area or work space). The cab area and the cargo area are separated by a transverse wall or bulkhead 48 which is provided adjacent the port side with an opening or passageway 50 to permit someone from entering the cargo area after passing through the opening behind the passenger seat. Access to the interior of the cargo area 46 is also available through the opening 52 when the sliding door 24 is in the open position shown in FIG. 6.

Figure 4:
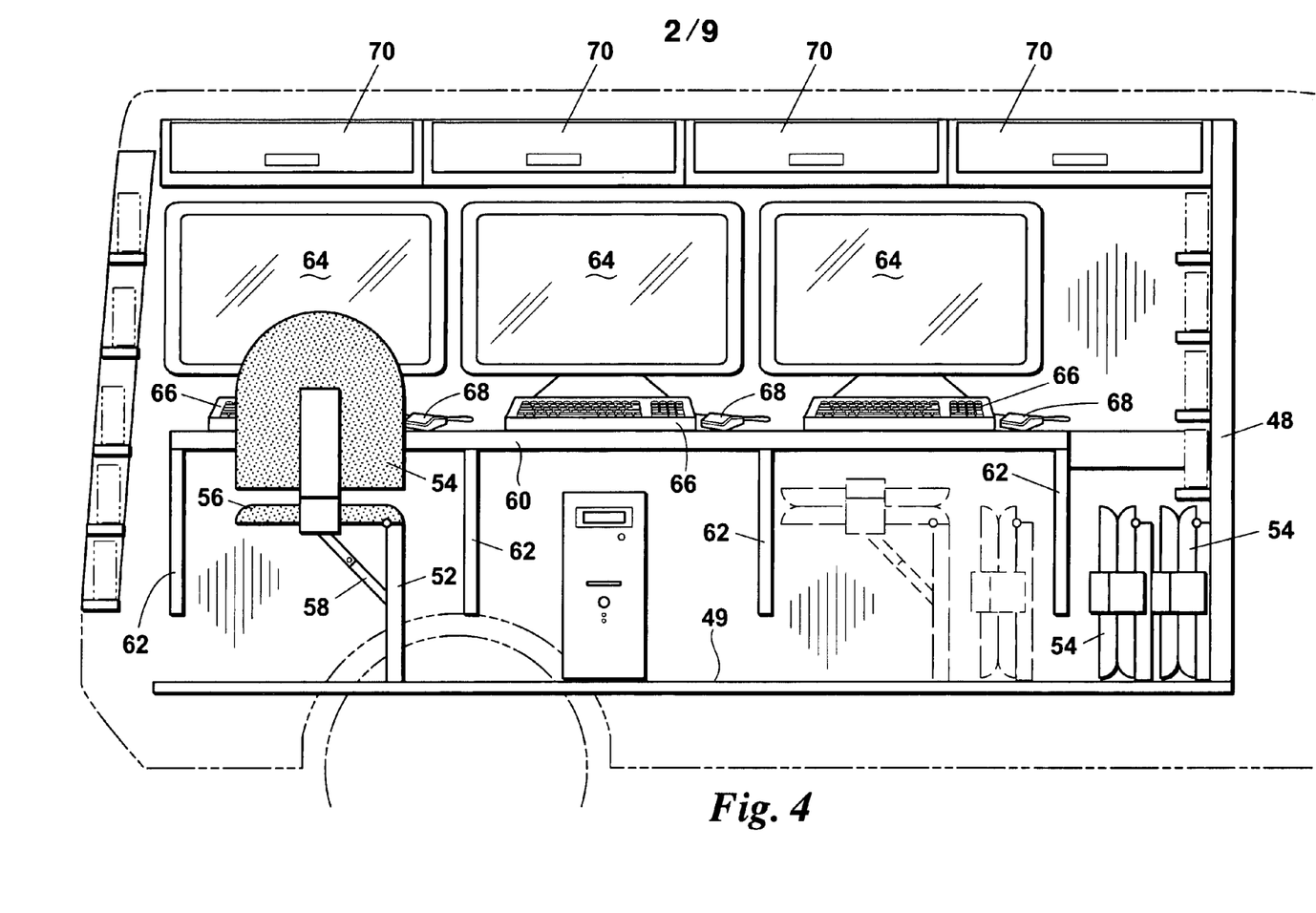
FIG. 4 is a sectional view of the starboard side of the vehicle and showing the chairs and other equipment mounted on the inside port wall of the vehicle.
Figure 5:
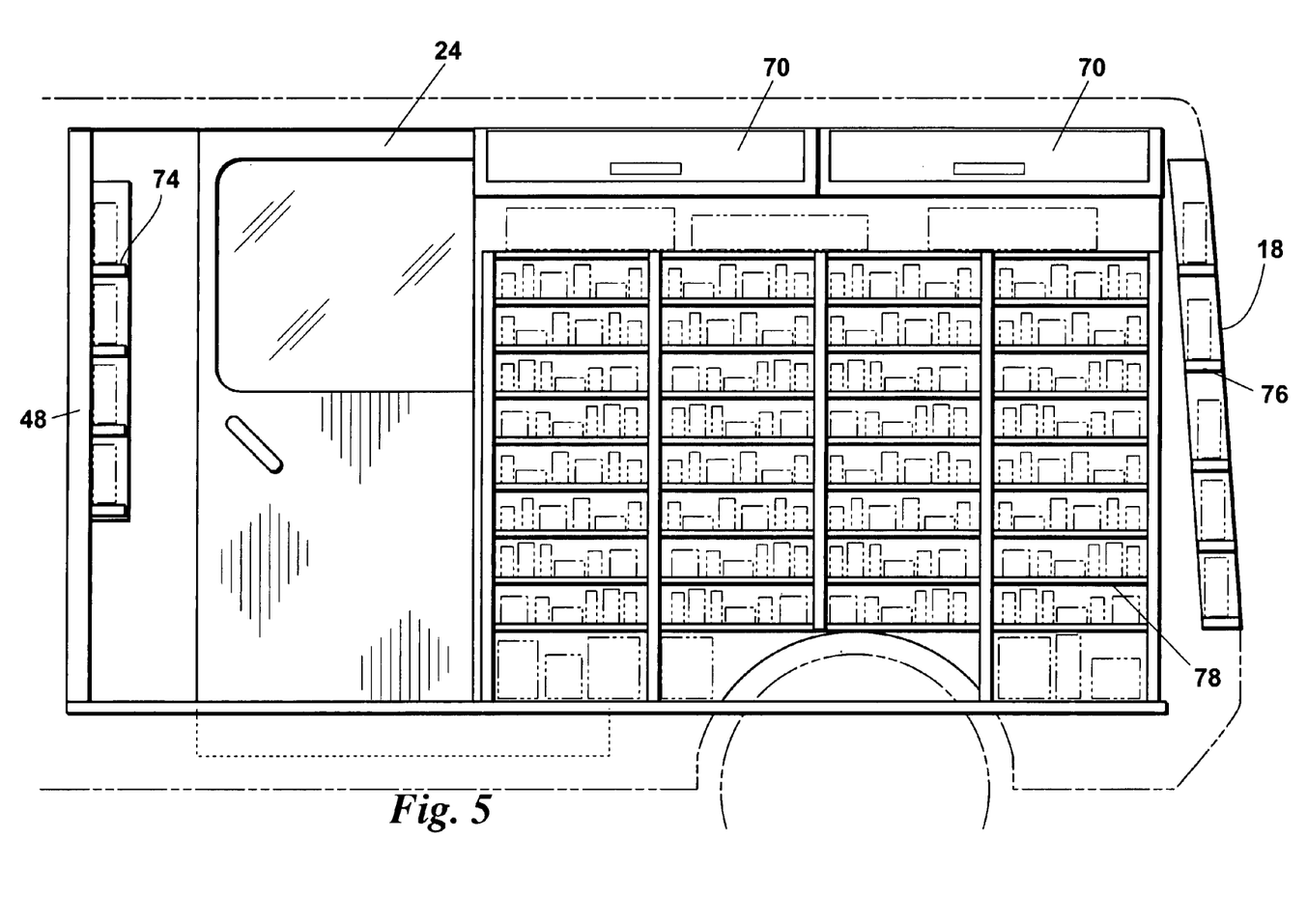
FIG. 5 is a view inside of the vehicle opposite that shown in FIG. 4.
Figure 6:
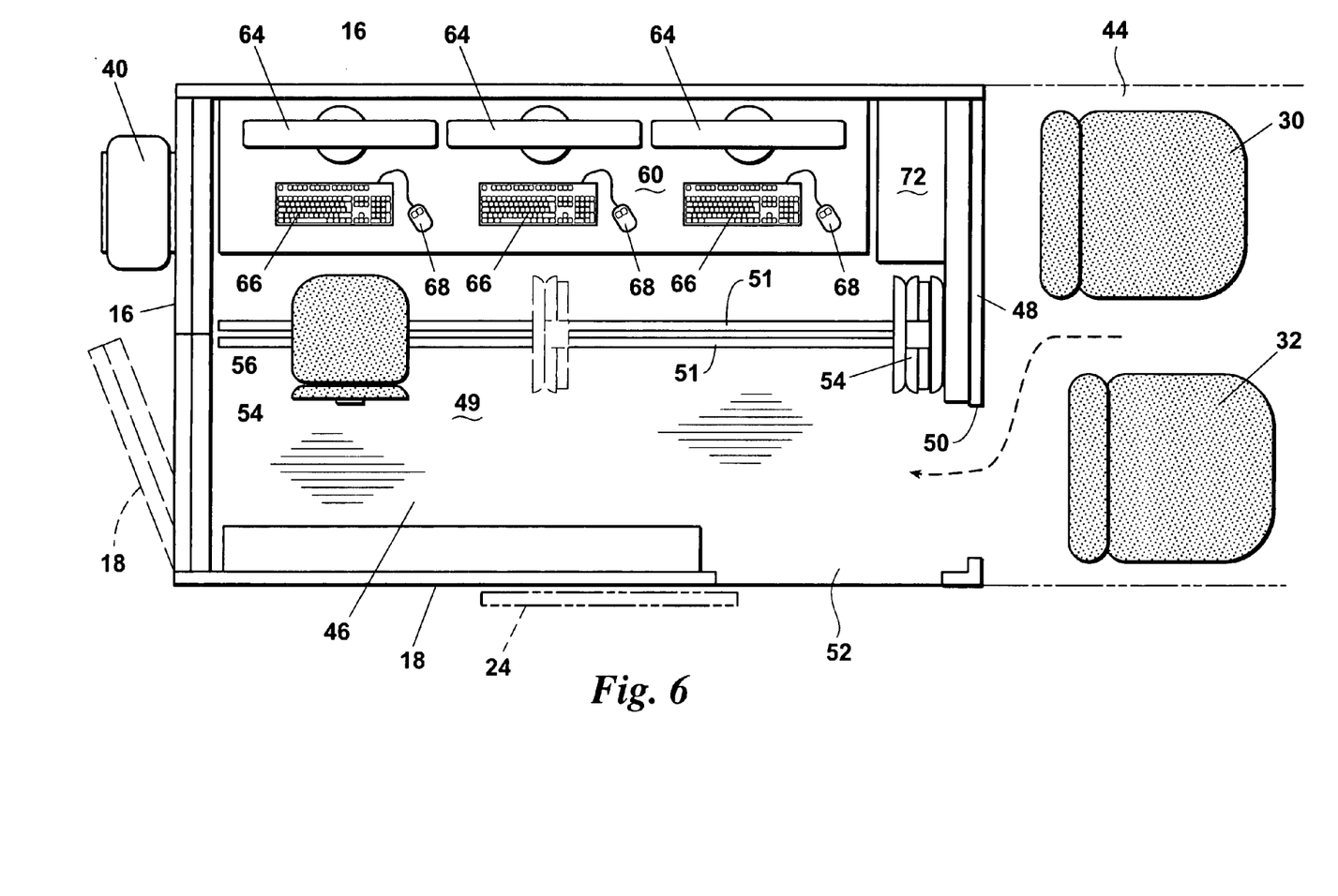
FIG. 6 is a plan view of the vehicle having everything removed.
Figure 7:
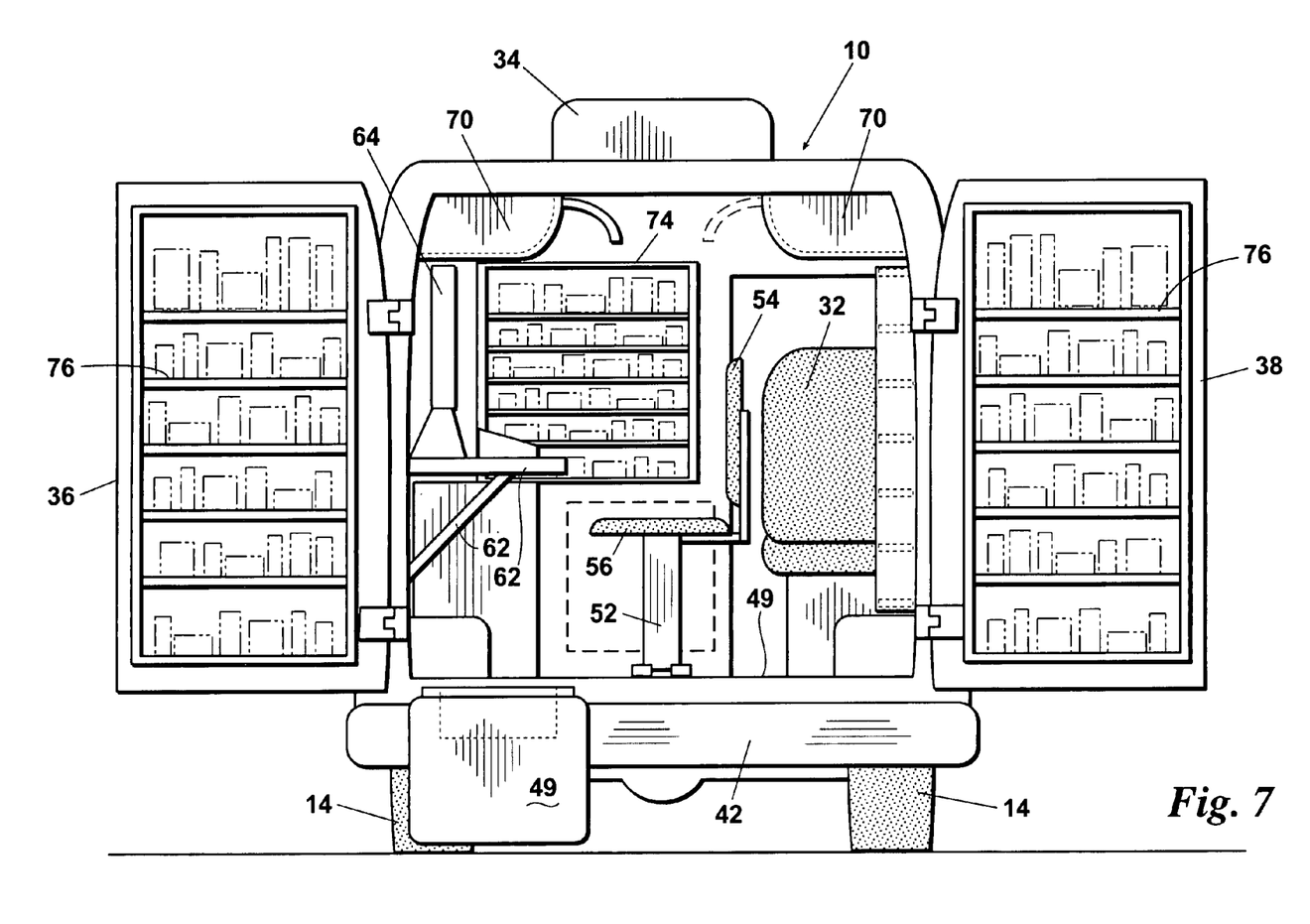
FIG. 7 is a rear view of the vehicle with the rear doors open to show the interior of the vehicle.

As best shown in FIGS. 4, 6 and 7, the cargo area 46 is provided with a floor or deck 48 which extends for essentially the entire length of the cargo area. Mounted essentially mid-way along the floor 48 are a pair of parallel tracks 51 separated from each other so as to provide a sliding arrangement for a vertical leg 52 of a slidable seat 54. The slidable seat 54 has an upper portion which folds in relation to a horizontal seat portion 56. The vertical or back portion 54 folds down against the sear 56 and these parts together fold by means of a folding strap 58 against the leg 52. The seat 54 can be removed and stored behind the bulkhead 48 at the forward end of the tracks 51.

In the cargo area 46 and adjacent the inner side of the left (port) side 16 of the vehicle is an elongated desk or work surface 60 supported by vertical legs 62. Mounted along the port wall 16 above the table 60 are three flat screen monitors 64. Each flat screen monitor has associated with it a keyboard 66 and a mouse 68. Above the flat screen monitors and along the roof of the vehicle are a plurality of airplane type storage bins 70. Likewise, along the roof of the van opposite from the last mentioned array, are additional bins 70. Immediately behind the bulkhead along the vertical wall thereof are a plurality of shelves (unnumbered) and immediately to the rear of the shelves is an area 72 for housing a CPU and a credit card machine.

The mobile van of the present invention will require a large amount of shelf space for the storage of the numerous components that the van must carry. In this regard, the rear wall of the bulkhead 48 behind the driver's seat 30 is provided with shelves 74. The insides of the two rear doors are provided with shelves 76. The entire inner starboard side of the van behind the sliding door 24 is provided with shelves 78.

FIGS. 8A through 8D, inclusive, describe the manner in which the mobile unit or store 10 shown in FIGS. 1 through 7 is employed in the computer repair or refurbishing business. Thus, with respect to FIG. 8A, the mobile computer repair concept 90 is designed to embrace the three common types of business; i.e., commercial 92, residential 94 and government 96. It is contemplated that these three modalities would include upgrades, networking, wireless network 98, software configuration 100 all within the purview of the repair work that is done by the mobile repair unit of FIGS. 1 through 7.

Figure 8A:
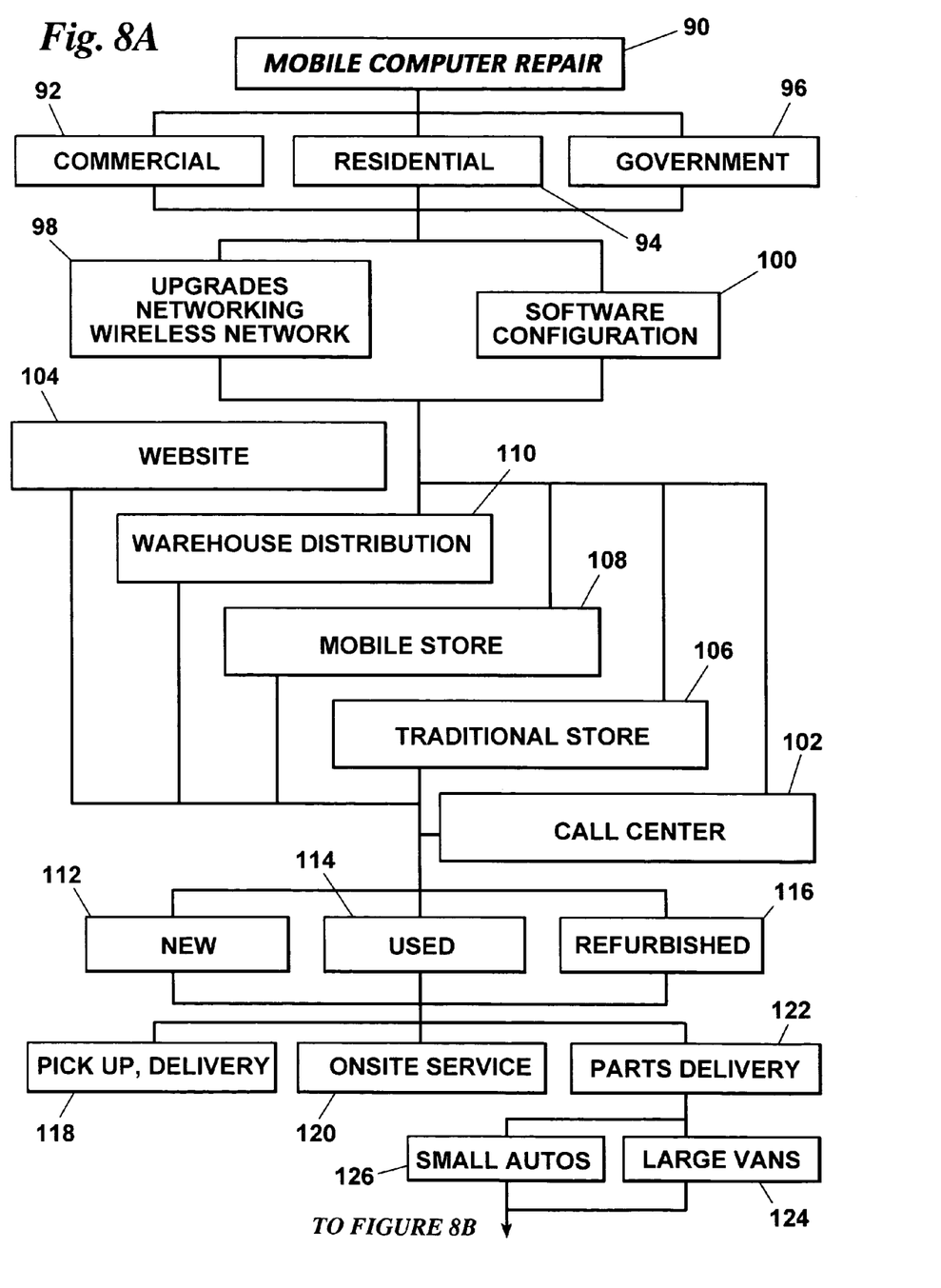
FIGS. 8A through 8D together constitute a block diagram showing the purposes of the vehicle of the present invention with the various components utilized to accomplish that purpose.

Requests from customers come into the call center 102 or the website 104. Depending upon the nature of the call the information is directed to the traditional store 106 or the mobile store 108, or to warehouse distribution 110, in the event that the store is out of the item requested. When the information is directed to the mobile store or the traditional store, then the parts needed are the new parts 112, used parts 114 or refurbished parts 116. Normally, new parts will be used unless the customer specifically requests used or refurbished parts. The parts requests, new, used or refurbished will have to be picked up, and if not at the traditional store or the mobile store, then delivered to the traditional store or mobile store. Each location for the storage of parts, that is the mobile store 108, the traditional store 106, or the warehouse distribution 110 will know precisely what is on hand at each of the locations and thus it will be determined through the pick-up and delivery service 118, whether or not the parts delivery 114 should be actuated, or, if the mobile unit has the part in which case on-site service 116 will prevail. Any time of day that the call has come into the call center 102 or the website 104 the parts delivery can be placed in the van. Depending upon the demands created by the call to the call center or the request of the website 104 the computers at the traditional store, mobile store or the warehouse distribution will determine, through the pick-up and delivery service 118, where and when the part needs to be shipped, if at all. If no shipment is needed, the part is already at the mobile store then on-site service will prevail. If the part is needed for the job and is not in the van then it can be placed in the large van 124 before the latter leaves for work for the day. Otherwise, if a call comes in during the day or near the end of the day, parts delivery 122 will see that delivery is made by small auto 126.

Figure 8B:
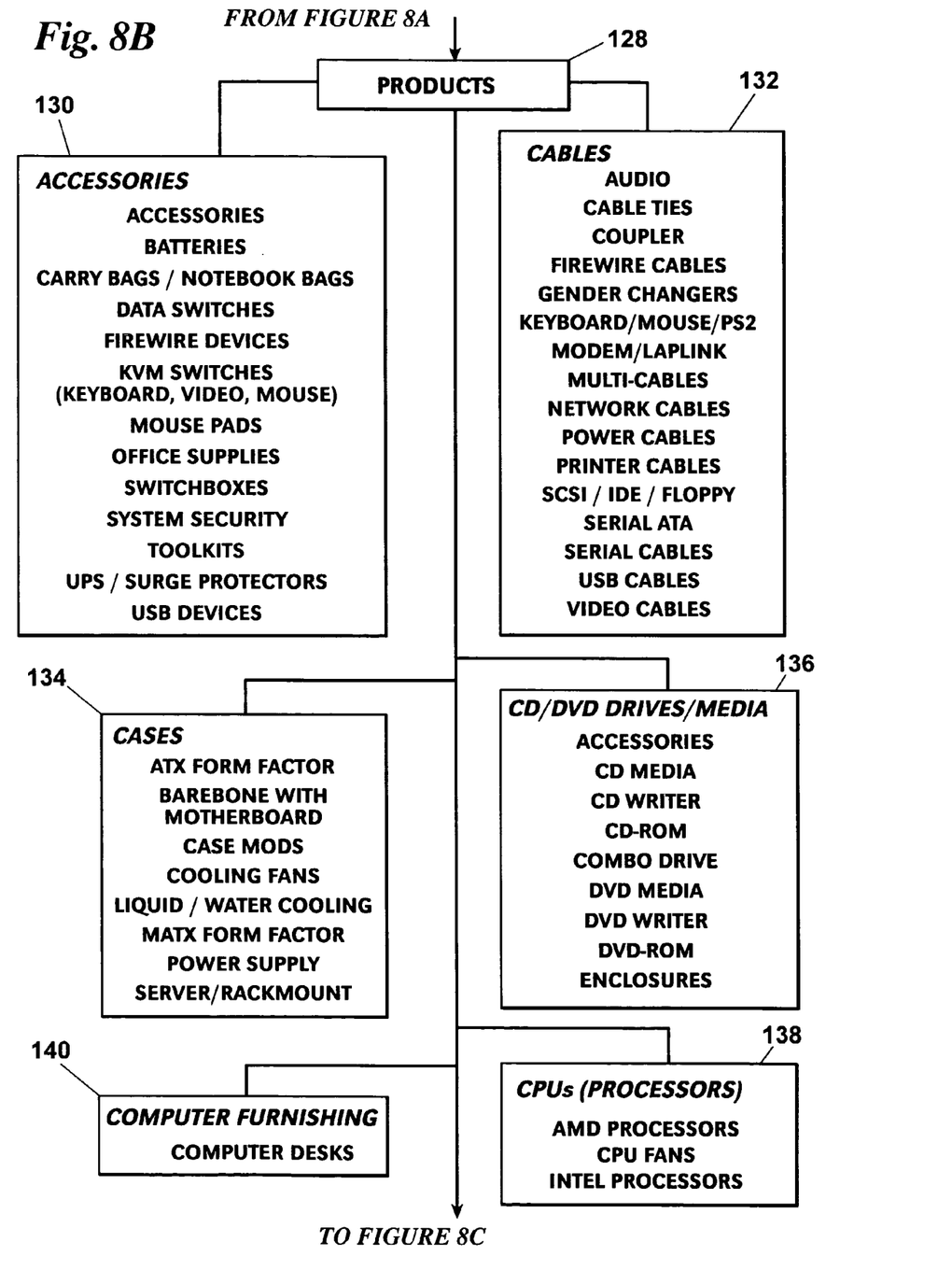
Figure 8C:
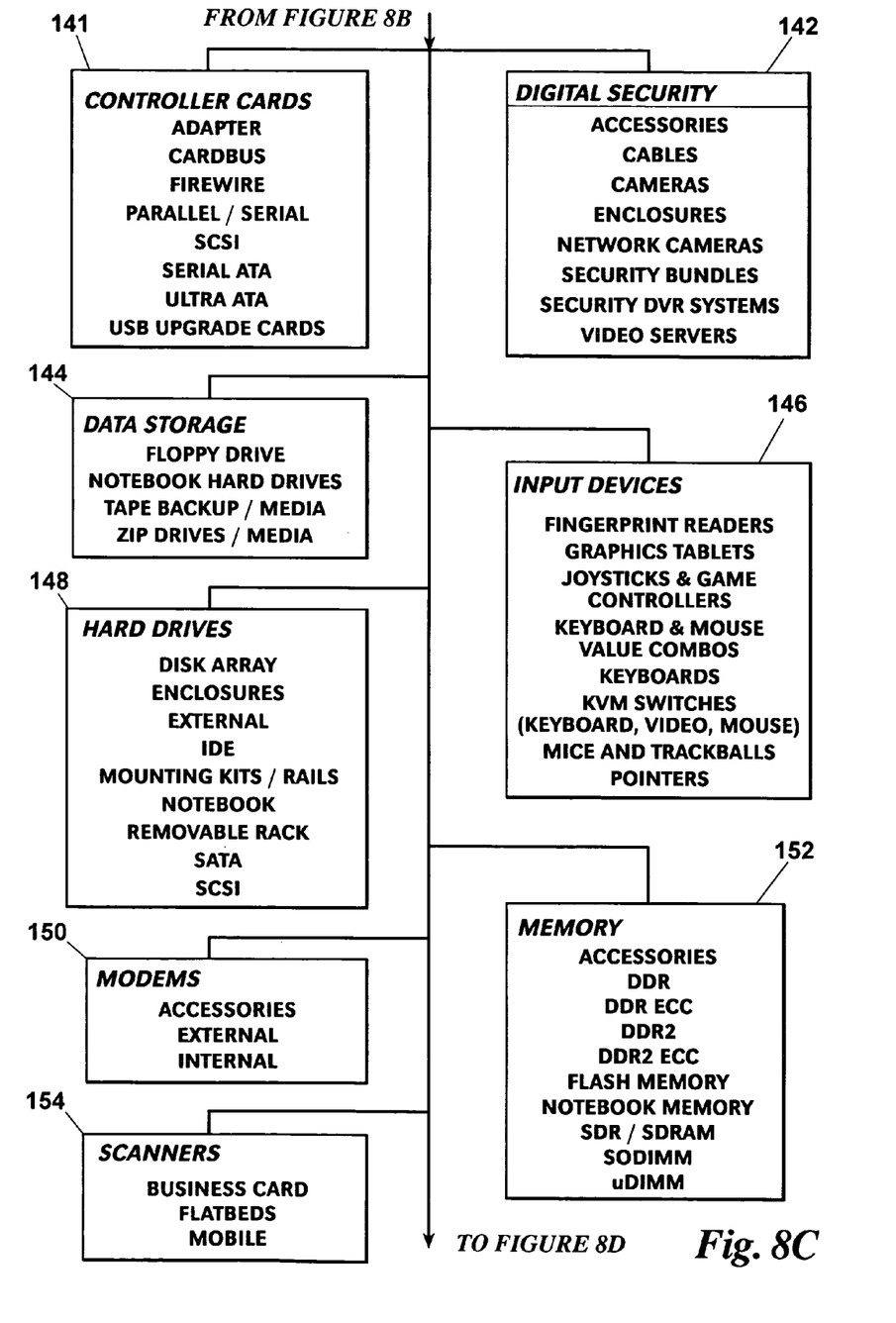

Turning now to FIG. 8b, when the call comes in to the call center 102 or the website 104 the request will be in the nature of some type of repair service or refurbishment which will necessitate some product 128. The parts can be numerous and varied as indicated in 8b, including numerous accessories 130, such as cables 132, which can be used to build computers 134 plus other items of electrical or electronic nature which utilizes cases in which the equipment is mounted. Also the parts could include different kinds of drives 136 and CPU processors 138. Occasionally, a request might require computer refurbishing 140 of computer disks, for example. Other products required to complete the customers requests involve controller cards 142, accessories used in conjunction with digital security 144, floppy drives used for data storage 146, devices including unusual things such as finger print readers, joysticks and game controllers 148. Hard drives are always a possibility 150 and modems are frequently required 152. In any computer repair facility a person should be in a position to provide memory 154 and auxiliary equipment such as scanners 156.

Figure 8D:
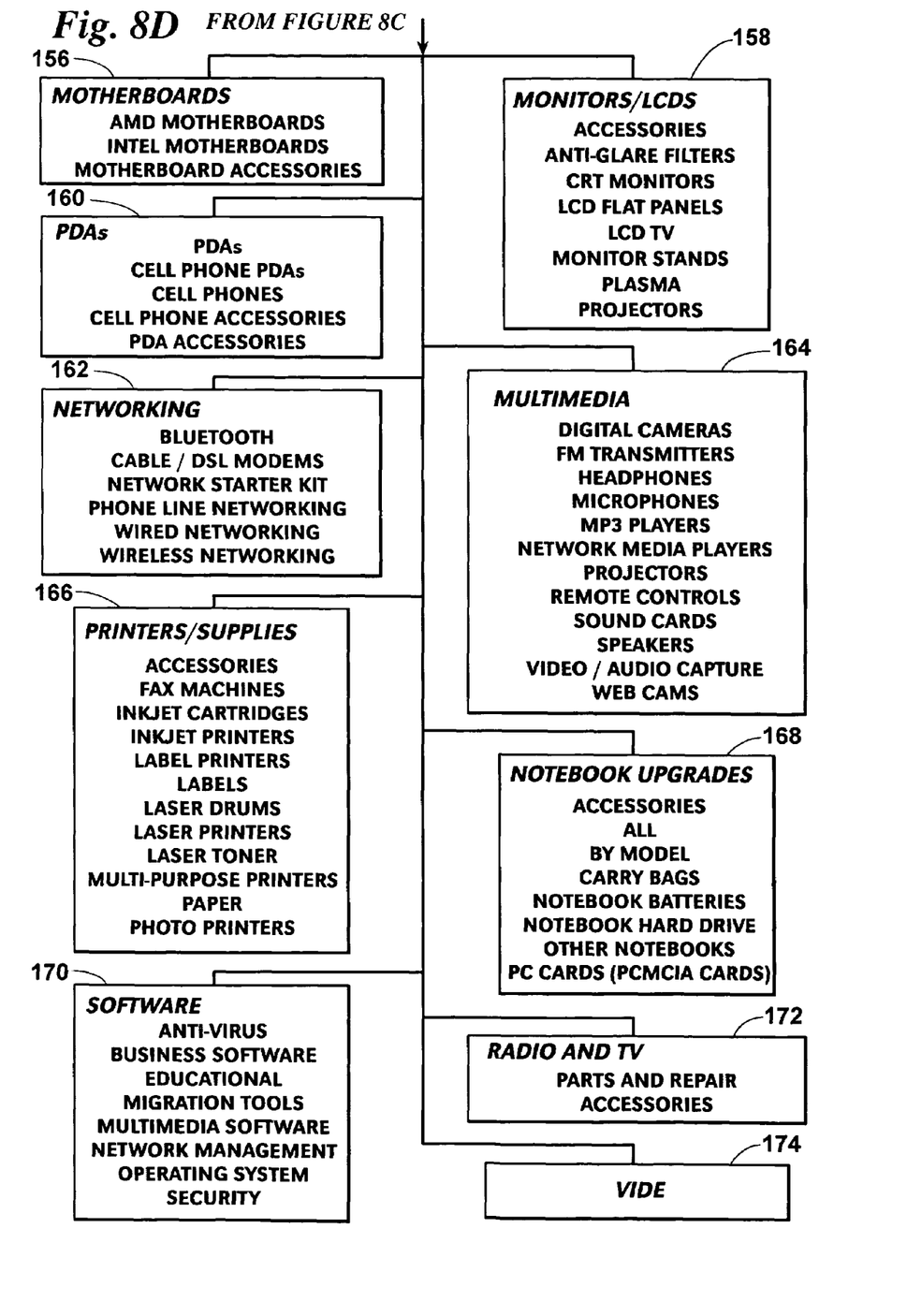

Referring to FIG. 8d, the demands on the computer store might also include requests for motherboards 158, monitors 160, PDA and cell phones 162. Similar requests might involve networking 162, multimedia considerations 164; in some cases the requests might require providing fax machines, printers, and supplies 166. Incidental accessories such as notebook batteries and notebook upgrades 168 might fall within the purview of a customers request. Finally, the customer might wish to purchase software to solve particular problems of that customer, in which case the software 170 would be provided with whatever other tools are associated with the software. In the unusual event that the customers problems are not what they appear, the system is prepared to offer services in parts that connect with radio and T.V. 172 and Vide 174.

Whereas the present invention has been described in particular relation to the drawings attached hereto, it should be understood that other and further variations and modifications of the invention may be made within the spirit and scope of this invention.

What is claimed is:

1. A method of conducting an electronic repair business employing a mobile laboratory comprising:
   (a) converting a preexisting mobile vehicle of the van type into a mobile electronic laboratory and repair shop by first stripping all of the preexisting components in the van rearward of the existing front seats to provide a relatively flat floor from the front seats to the rear doors of the vehicle, the resulting floor being 10 to 12 feet wide, 16 to 18 feet in longitudinal direction and having a work space approximately 6 feet above the resulting floor;
   (b) providing a transverse bulkhead arranged vertically behind the front seats;
   (c) providing a longitudinally extending track in the floor of the vehicle and extending from the rear doors forwardly to the bulkhead;
   (d) providing seats having bases which are slidable longitudinally in the track;
   (e) providing a workbench on one side of the vehicle whereby the seats are moveable to different positions along the workbench;
   (f) providing electronic equipment on the workbench including monitors, keyboards and mice for analyzing problems in customers equipment by the people occupying the seats;
   (g) providing shelving along the interior walls of the vehicle and in spaces adjacent the roof of the vehicle for the storage of numerous parts and electronic components for use in repair and upgrades on equipment brought in by customers to be repaired and upgraded; and
   (h) driving the mobile vehicle to a location where electronic repair is in demand.

2. The method of conducting an electronic repair business employing a mobile laboratory as set forth in claim 1 wherein the shelves are provided with aircraft type closures to prevent spillage of materials from the shelves when the vehicle is moved.

3. A van conversion for providing a mobile laboratory for conducting an electronic repair business wherein the cargo space of the van is converted into an open area rearward of the front seats of the vehicle, a vertical transverse bulkhead behind the front seats, the rear area including a relatively flat horizontal floor having a length of 16 to 18 feet, width of 10 to 12 feet and a space above the floor to the ceiling of the vehicle of approximately 6 feet, the floor having a longitudinally extending track from the rear of the vehicle to the bulkhead, one side of the vehicle being provided with a workbench spaced above the floor a convenient distance for working purposes, the workbench being provided with necessary monitors, keyboards and electronic mice and other electronic accessories for analyzing and solving electronic problems in connection with equipment brought in by customers to be repaired, seats slidable along the track in relation to the workbench so that people can sit on the seats and work on customers products, the interior sides of the vehicle being provided with shelving, the rear doors of the vehicle being provided with interior shelving, the shelving being provided for storage of electronic parts and components.

* * * * *